United States Patent [19]
Chown et al.

[11] 4,185,883
[45] Jan. 29, 1980

[54] OPTICAL FIBER COUPLING ELEMENT

[75] Inventors: Martin Chown, Harlow; John S. Leach, Bishops Stortford, both of England

[73] Assignee: ITT Industries, Inc., New York, N.Y.

[21] Appl. No.: 889,968

[22] Filed: Mar. 24, 1978

[30] Foreign Application Priority Data

Apr. 5, 1977 [GB] United Kingdom ............... 14326/77

[51] Int. Cl.² .............................................. G02B 5/14
[52] U.S. Cl. .................................................. 350/96.20
[58] Field of Search ................. 350/96.20, 96.21, 96.22

[56] References Cited
U.S. PATENT DOCUMENTS

| | | | |
|---|---|---|---|
| 3,948,582 | 4/1976 | Martin | 350/96.21 |
| 4,078,910 | 3/1978 | Dalgoutte | 350/96.21 X |
| 4,118,100 | 10/1978 | Goell | 350/96.20 |

FOREIGN PATENT DOCUMENTS

| | | | |
|---|---|---|---|
| 2425798 | 1/1975 | Fed. Rep. of Germany | 350/96.20 |
| 2619625 | 11/1976 | Fed. Rep. of Germany | 350/96.20 |

OTHER PUBLICATIONS

M. D. Wagh, "Coupling Efficiency Between Light Pipes of Different Dimensions" Applied Optics, vol. 15, No. 11, Nov. 1976, pp. 2840-2843.

*Primary Examiner*—Rolf G. Hille
*Attorney, Agent, or Firm*—T. L. Peterson

[57] ABSTRACT

An optical fiber coupling element in which a short length of optical fiber is placed in a glass sleeve with one end of the fiber projecting from the sleeve. The glass sleeve is collapsed onto the fiber, and a watch jewel is fitted over the fiber end. The other end of the sleeve is flared to facilitate the insertion into it of a second fiber. The sleeve and jewel are sealed into one end of a ferrule.

6 Claims, 3 Drawing Figures

OPTICAL FIBER COUPLING ELEMENT

BACKGROUND OF THE INVENTION

This invention relates to optical fiber couplings, and especially to such couplings for use in the field.

In the application of D. G. Galgoutte entitled "Optical Fiber Joining", Ser. No. 676,731, filed Apr. 14, 1976, now U.S. Pat. No. 4,078,910, there is described a method of butt-jointing optical fibers in which the ends of the fibers are inserted into the opposite ends of a glass sleeve. The sleeve has a melting point lower than that of the fibers. The sleeve is heated to cause the sleeve to collapse onto the fibers to bring the fiber ends into lateral alignment. Dalgoutte has also described a method of butt-jointing fibers in which the glass sleeve is collapsed onto only one fiber, whereafter the other fiber is inserted into the sleeve and secured therein by an index-matching adhesive.

An object of this invention is to provide a coupling element which embodies the principles of the above-mentioned couplings, but which is readily applicable to in-field use.

SUMMARY OF THE INVENTION

According to a principal aspect of the present invention, there is provided an optical fiber coupling element which includes a sleeve of glass or a glass-like material. A length of optical fiber is fixed within the sleeve with one end of the fiber projecting from one end of the sleeve but its other end short of the other end of the sleeve. When in use, an optical fiber is inserted into said other end of the sleeve so that its end is adjacent to or in abutting relation with the length of fiber within the sleeve. A suitable optically transparent adhesive may be used to secure the fiber thus inserted in place in the sleeve. When in use, the projecting end of said length of fiber within the sleeve cooperates in the establishment of a connection with another optical fiber.

A preferred technique for establishing the connection with another fiber is for the above-mentioned projecting end to be located centrally in a ferrule by a watch bearing jewel, which ferrule can then cooperate with another similar ferrule in a connector.

DESCRIPTION OF THE PREFERRED EMBODIMENTS

In the preferred embodiment of the invention, there is provided an optical fiber coupling element which includes a sleeve of a glass or a glass-like material having a softening point lower than that of the optical fiber with which it is to be used. A length of optical fiber is located within the sleeve with one end of the fiber projecting from one end of the sleeve but its other end is short of the other end of the sleeve. The sleeve is collapsed onto the fiber to retain the fiber in place within the sleeve. Said other end of the sleeve is flared to facilitate the insertion of an optical fiber thereinto. A watch jewel is fitted over the projecting end of the length of fiber and the jewel and the sleeve are located in a ferrule with the jewel adjacent one end of the ferrule. The sleeve is maintained centrally within the ferrule by a filling between the outer surface of the sleeve and the inner surface of the ferrule.

Thus it is possible to factory-produce a termination assembly with a fiber-receiving socket "built-on" to it, which can readily be fixed to an optical fiber end in the field, where factory-type machinery is in general not available. Such a termination can exploit factory techniques, such as the application of anti-reflection coatings and polishing the end-face of the termination, which are not readily performed in the field. Two cables each terminated in this manner can then be connected readily, the loss of light at the connection point being relatively low. It should be noted that the present invention can be used in both single-way and multi-way connectors.

Figures 1, 3:
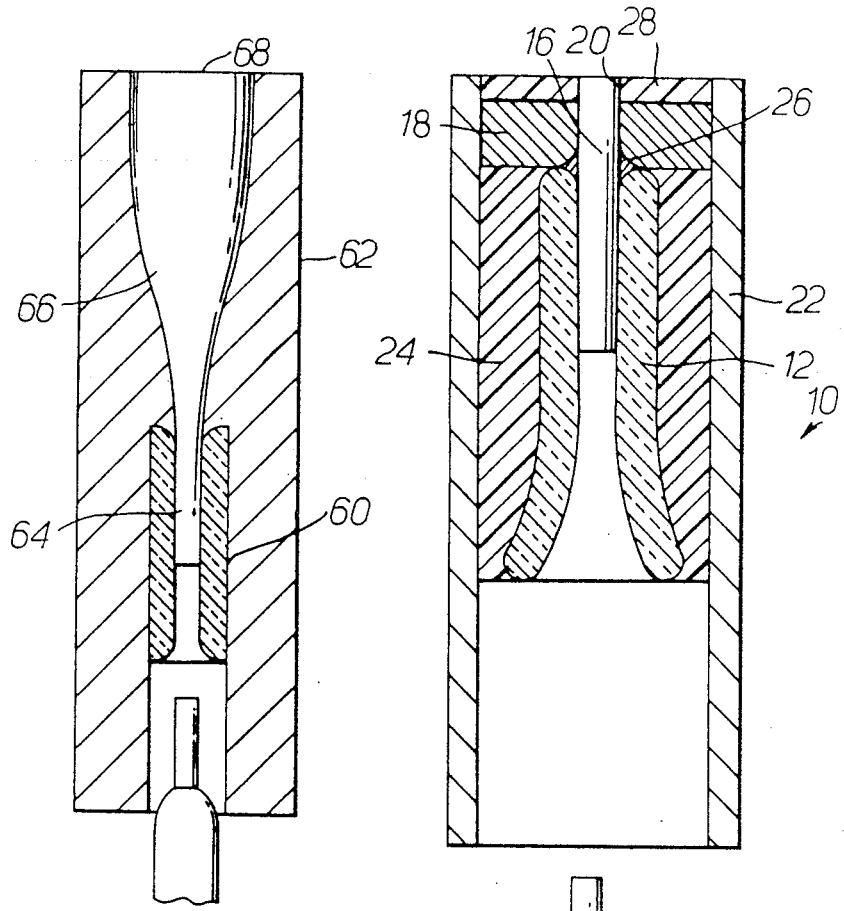
FIG. 1 is a longitudinal sectional view of an optical fiber coupling element in accordance with one embodiment of the invention, showing a fiber positioned to be inserted into the glass sleeve in the element.
FIG. 3 is a longitudinal sectional view similar to FIG. 1 showing a third embodiment of the invention.

The optical fiber coupling element shown in FIG. 1, generally designated 10, uses a sleeve 12 of a glass or glass-like material which has a lower softening point than does the optical fiber to be terminated. The sleeve has secured within it a short length of an optical fiber 16 which in the arrangement shown has a diamater of 100 $\mu$m. To secure the fiber 16 in the sleeve, the fiber length is inserted into the sleeve the internal diameter of which is substantially constant over a major portion of its length. The region containing the fiber 16 is heated, e.g., by placing it in an induction heating coil. During this heating, the glass sleeve softens and collapses inwards onto the fiber. This collapse is probably caused in part by a capillary effect. The collapse commences at or near the lower end of the fiber 16 and the collapse region propagates during heating toward the upper end of the fiber. When the collapse region reaches the end, the heating is terminated. Heat is not applied to the lower end of the fiber so that such end is flared after the upper end is collapsed onto the fiber 16.

Note that the fiber 16 has its upper end projecting from the uppermost end of the sleeve 12, and the fiber sleeve combination is fitted to a watch bearing jewel 18 whose central hole 20 has a fairly close fit about the fiber. This jewel is mounted in a high precision metal ferrule 22 so as to be near the upper end of the ferrule. The lower end of the sleeve 12 is located well within the ferrule 22, and is maintained in place by a filling 24 of a suitable support material such as a glass or an epoxy material, as shown. This filling also extends into the recessed portion 26 of the watch jewel 18. At the upper end of the ferrule there is a filling 28 of a fired glass frit or of an epoxy, as shown, which embraces the fiber end and fills the rather shallow recess defined by the front face of the jewel and the sides of the ferrule. The upper end of the ferrule is ground so that the end face formed by the ferrule 22, the filling 28, and the end of the fiber 16 are ground flat and then polished. After this, the fiber can, if desired, be provided with an anti-reflection coating.

To attach the element 10 of FIG. 1, which is factory-produced, to an optical fiber 30, the latter has its plastic coating 32 whose outside diameter is 1 mm, stripped back as shown at 34. To fit the fiber to the ferrule 22, the fiber 30 is inserted thereinto so that its stripped end 34 enters the down flared end of the sleeve 12. Then the fiber is secured in place by a filling, not shown, such as glass or an epoxy material, which locks the fiber in place. To effect this securing, it is possible if desired to heat the termination to cause collapse of the flared end of the sleeve 12 onto the fiber 34, this in addition to the use of a filling.

In use, two fibers 30 each terminated by a coupling element 10 such as that of FIG. 1 are fitted together inside a sleeve (not shown) of a suitable material such as steel, the internal diameter of which is such that the ferrules have close sliding fits therein. In addition, spring means can be used to retain the end faces of the elements 10 in engagement with each.

The two elements 10 are pushed together so that the fiber ends abut in aligned relation, the accuracy of which is high due to the high dimensional accuracy of the jewls and the ferrules.

In the case of a multi-way connector, a number of terminations such as described above are located in each of the two connector members, which are held together by means well-known in the electrical connector art.

Figure 2:
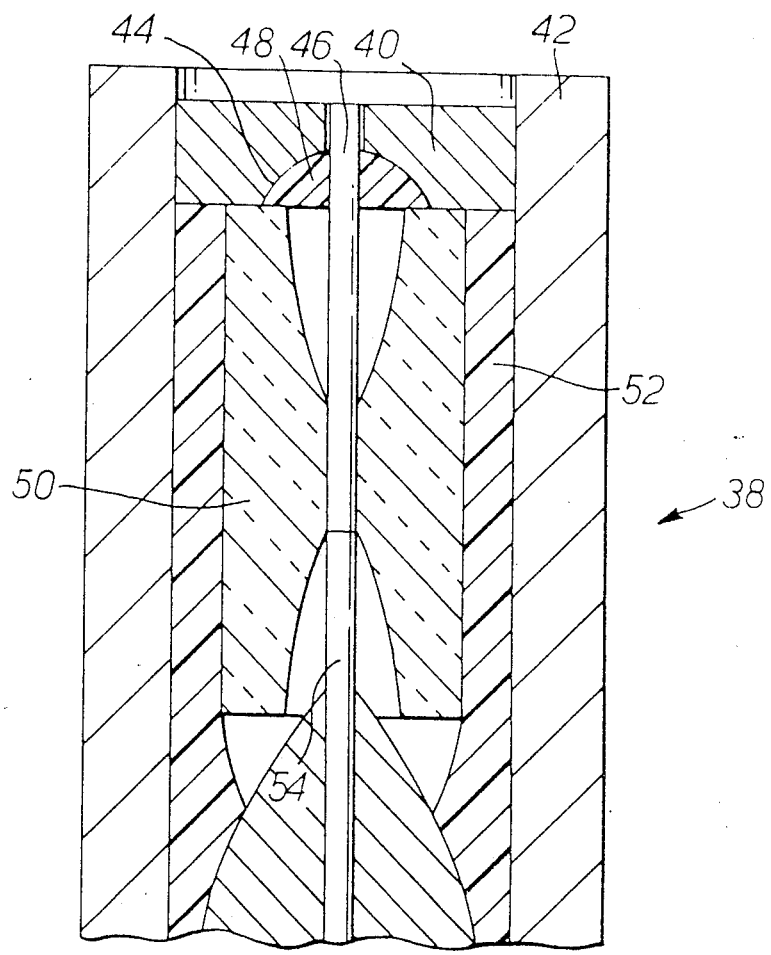
FIG. 2 is a longitudinal sectional view of a second embodiment of the invention showing a fiber inserted into the sleeve of the coupling element.

The coupling element 38 shown in FIG. 2 is similar in many respects to that shown in FIG. 1, FIG. 2 showing such an element with a fiber in place. Here the watch jewel 40 is mounted near one end of a ferrule 42 with its recess 44 facing inwards. The fiber 46 is held in place in the jewel by a potting material, such as a glass or epoxy material 48 in its recess. At its other end, the fiber 46 is polished and, if necessary, potted. Additional potting may not be needed if some of the material 48 fills the gap between the fiber and the jewel hole.

The glass sleeve 50 is held in its place in the ferrule by a filling 52 of a suitable glass or an epoxy compound. The fiber 54 to be terminated, which may as in the case of FIG. 1 be field-prepared, has its plastic coating removed at the end to leave a projecting length of fiber, which fits into the end of the sleeve 50. As in the case of FIG. 1, the facing ends of the fibers can be cleaved so that when the fiber 54 is in place, the two ends abut or the ends can be held together by an index matching cement, in which case, the ends can be rough broken. When the fiber is in place, further filling material such as epoxy can be used to seal the coated fiber in place.

The termination of FIG. 2, when in use, mates with another termination which has a projecting portion which is received in the end face recess of the ferrule.

It will be appreciated that watch jewels are not the only way to receive the end of the fiber in the coupling elements embodying the present invention, although such jewels are the preferred method. One further method is to use an expanded beam arrangement, as shown in FIG. 3, in which there is a sleeve 60 sealed into a ferrule 62, e.g. by the use of adhesive. As with the previously-described arrangements, the sleeve 60 accommodate a fiber 64 but as indicated at 66 the fiber increases in girth to produce an expanded beam arrangement whose end face 68 is relatively large. Because of the enlarged end faces which mate when two such terminations are used, the requirement for accuracy of alignment is somewhat less stringent than in the arrangements of FIGS. 1 and 2.

What is claimed is:

1. An optical fiber coupling element comprising:
   a ferrule having a front mating end and a rear optical fiber termination end;
   a sleeve of a glass-like material axially mounted in said ferrule, said sleeve having front and rear ends;
   a short length of optical fiber mounted in said sleeve with one end of said fiber projecting forwardly from said front end of said sleeve but the other end of said fiber being short of said rear end of said sleeve;
   said projecting end of said short length of fiber terminating closely adjacent to said front mating end of said ferrule;
   said sleeve being collapsed onto said fiber to fixedly retain said fiber therein; and
   the portion of said sleeve adjacent to said rear end thereof being shaped to provide a socket for receiving therein the end of a second optical fiber.

2. An optical fiber coupling element as set forth in claim 1 wherein:
   said portion of said sleeve is flared outwardly toward said rear end thereof.

3. An optical fiber coupling element as set forth in claim 1 wherein:
   said projecting end of said short length of optical fiber projects forwardly no further than said front mating end of said ferrule.

4. An optical fiber coupling element as set forth in claim 1 including:
   a watch jewel fitted over said projecting end of said short length of fiber and being fixedly mounted in said ferrule.

5. An optical fiber coupling element as set forth in claim 3 wherein:
   said sleeve is mounted in said ferrule by a filling material between the outer surface of said sleeve and the inner surface of said ferrule.

6. An optical fiber coupling element as set forth in claim 1 wherein:
   said projecting end of said short length of fiber flares outwardly to provide an expanded beam.

* * * * *